United States Patent [19]

Gyarmati et al.

[11] Patent Number: 4,762,269
[45] Date of Patent: Aug. 9, 1988

[54] METHOD OF JOINING MOLDED SILICON CARBIDE PARTS

[75] Inventors: Ernö Gyarmati; Aristides Naoumidis, both of Jülich, Fed. Rep. of Germany

[73] Assignee: Kernforschungsanlage Julich GmbH, Julich, Fed. Rep. of Germany

[21] Appl. No.: 866,597

[22] Filed: May 23, 1986

[30] Foreign Application Priority Data

May 24, 1985 [DE] Fed. Rep. of Germany ....... 3518710
Apr. 14, 1986 [DE] Fed. Rep. of Germany ....... 3612458

[51] Int. Cl.$^4$ .......................................... B23K 35/368
[52] U.S. Cl. ................................... 228/194; 156/89;
                                        228/263.12; 228/903
[58] Field of Search ...................... 156/89, 281, 325;
                                        228/121, 123, 194, 263.12, 903

[56] References Cited

U.S. PATENT DOCUMENTS

| 2,319,323 | 5/1943 | Heyroth . | |
|---|---|---|---|
| 3,517,432 | 6/1970 | Sandstrom | 228/121 |
| 4,156,051 | 5/1979 | Nakamura et al. | 428/446 |
| 4,419,161 | 12/1983 | Hailey | 156/89 |
| 4,482,418 | 11/1984 | Rigby | 156/89 |
| 4,487,644 | 12/1984 | Gupta | 156/89 |

FOREIGN PATENT DOCUMENTS

| 0598364 | 5/1960 | Canada | 156/89 |
|---|---|---|---|
| 0123212 | 10/1984 | European Pat. Off. . | |
| 1571297 | 12/1970 | Fed. Rep. of Germany . | |
| 2922953 | 12/1979 | Fed. Rep. of Germany . | |
| 3003186 | 8/1981 | Fed. Rep. of Germany . | |
| 0076467 | 4/1983 | Fed. Rep. of Germany . | |
| 3311553 | 11/1985 | Fed. Rep. of Germany . | |
| 0141681 | 7/1985 | Japan | 228/263.12 |

OTHER PUBLICATIONS

BMFT-FB T 79-124, Dec. 1979, pp. 55, 6, 25, 26.
Keramische Zeitschrift 37 Jahrgang Nr. 7,1985, Reportagen, p. 355 "Fugen von Keramik, Glas und Metall".
Fortschrittsberichte der Deutschen Keramischen Gesellschaft, Band 1 (1985) Heft 2., p. 189198.

*Primary Examiner*—Michael Ball
*Assistant Examiner*—J. Davis
*Attorney, Agent, or Firm*—Frishauf, Holtz, Goodman & Woodward

[57] ABSTRACT

Silicon carbon molded parts, whether made of silicon carbide sintered together in the absence of pressure or hot pressed silicon carbide are bonded together at close fitting surfaces by applying a layer not thicker than 1 μm on polished surfaces to be joined, containing at least one carbide and/or silicide forming element from the group Ag, Al, Au, B, Be, Co, Cr, Cu, Fe, Mg, Mn, Mo, Nb, Ni, Pd, Pt, Ta, Ti, V, W and Zr. The surfaces to be joined are than fitted together and heated in an inert or reducing atmosphere at a pressure between $10^{-1}$ and $10^{-5}$ Pa at temperatures in the range 800° to 2200° C. while under a pressure applied which is between 1 and 100 MPa. In particular, the heat treatment range from 1550° C. to 1750° C. under a pressure of 15 to 45 MPa applied pressure in argon at a pressure of from $10^3$ to $10^5$ Pa argon, for 30 to 60 minutes. Preferably a thin layer is vapor-deposited or sputtered. Cr, Cu, Ni, Pt and/or Pd, and especially Cu and its alloys, have been found particularly effective.

21 Claims, 1 Drawing Sheet

METHOD OF JOINING MOLDED SILICON CARBIDE PARTS

This invention concerns a method of bonding together silicon carbide molded parts in which polished fitting surfaces on which a free element is present, are put together and are heated under pressure to high temperature in an inert or reducing atmosphere.

In accordance with the invention, firmly bonded joints are produced between parts of pressureless sintered silicon carbide (SiC) and/or hot-pressed silicon carbide (H.P.SiC). In other words, good bonds can be produced between parts effectively of these two kinds of silicon carbide or between two parts of either kind.

Silicon carbide parts for constructing composite constructions can be made mainly in three different processes that produce respectively different kinds of material, namely:

(1) Infiltrated or reaction bonded silicon carbide (SiSiC)
(2) Pressureless sintered silicon carbide, and
(3) Hot pressed silicon carbide.

Molded parts of infiltrated or reaction bonded silicon carbide, which can be obtained by siliconizing so-called green bodies of carbon or of carbon and silicon carbide, contain between 5% and 30% by weight of free silicon which can be utilized for bonding molded parts together.

Thus according to published German application (OS) No. 30 03 186, individual parts of SiSiC are fitted together to make a work piece and are bonded by socalled diffusion welding at temperatures somewhat below 1300° C. with simultaneous pressure loading of the bonding surface. According to European published application EP 0 076 467 ground and polished bonding surfaces of SiSiC molded parts are fitted together and then bonded together by heating up to 1500°–1800° C. (i.e., above the melting point of silicon). With both of the processes just mentioned, there are obtained dense joints which are mechanically firm up to about 1400° C., capable of withstanding temperature changes and resistant to corrosion and oxidation, showing a narrow silicon seam of about 1 μm thickness, sometimes containing a very fine silicon carbide precipitation.

Independently of the presence of free silicon in the material, it is possible to join together silicon carbide construction components by fitting them together with the assistance of cement spreads containing carbon or carbon/silicon carbide with an organic binder, by coating joint surfaces with this cement and subsequent heating with infiltration of silicon for converting the carbon into silicon carbide. Different variants of this process are described, for example, in U.S. Pat. No. 2,319,323 and German OS No. 29 22 953.

According to German OS No. 33 11 553 of the assignee of the present application, the cement or carbon, instead of being introduced between smooth joining surfaces, is put into surfaces of the parts that are roughened for this purpose.

Ceramic molded parts are bonded together without any binder whatever according to U.S. Pat. No. 4,156,051 by first pre-sintering the parts individually in a first stage to a density of at least 65% of the theoretical density, then put together and finally again hot pressed, this time to a density of about 98% of the theoretical density. This process is expensive and troublesome, since in the second stage it is not only the surfaces fitting together that need to be pressure-loaded.

Finally, it was tried remarkably often to join hot pressed silicon carbide by means of metals or metal layers. In this case, it was always tried to overcome the difference in thermal expansion coefficients between silicon carbide and metal either by forming intermediate phases (silicides and/or carbides) or by means of SiC-metal powder mixtures stepwise raised in metal content towards the pure metal boundary. In the report BMFT-FB T 79-124, it was reported, for example, regarding the bonding of hot pressed SiC by means of thin layers (100–500 μm) of hot pressed tungsten and molbydenum powder that were likewise to be compacted in the joint. Cracks running out of the transition zone into the SiC, as well as the high porosity in the hot pressed material, are characteristic for joints of that kind.

SUMMARY OF THE INVENTION

It is an object of the present invention to make enduringly bonded joints of silicon carbides molded parts of silicon carbide, both either pressureless sintered or of hot pressed silicon carbide, or one kind with the other, by providing a jointure seam that is mechanically stable up to about 2200° C., gas-tight, resistant to corrosion and oxidation and capable of withstanding temperature change.

Briefly, such parts are joined by providing polished fitting surfaces of at least one part participating in the joint with an activating layer not more than 1 μm thick, comprising at least one carbide and/or silicide forming element selected from the group consisting of Ag, Al, Au, B, Be, Co, Cr, Cu, Fe, Mg, Mn, Mo, Nb, Ni, Pd, Pt, Ta, Ti, V, W, and Zr and then press-welding the fitted-together part in an inert or reducing atmosphere in the pressure range of $10^{-1}$ to $10^5$ Pa at temperatures in the region from 800° to 2200° C., with the application of pressure in the range from 1 to 100 MPa.

In the process of this invention a very thin "activating" and covering layer of a material forming a carbide or silicide or both, is applied to one or both of the surfaces, of high surface quality, which are to be joined, and in the following treatment of the joint at raised temperature and pressure, this layer practically vanishes and is no longer to be found as such in the joint surface. The joining process or method of the present invention is thereby distinguished clearly from known processes which operate with an adhesive layers containing foreign material.

The activating layer of the carbide and/or silicide forming element, or mixtures or alloys of same is preferably applied in a thickness of from 0.1 to 1 μm according to any suitable method on at least one fitting surface. It can be conveniently applied, for example, by vapor deposition or by sputtering. In the case of alloys, they may be formed in place, or the constituent metals may be alloyed together in application simultaneously as a layer. The bonding temperature that is used is determined according to the nature of the applied activation layer: for Ag, Al, Au and Mg the temperature is selected to be between 800° and 1200° C.; for Be, Cu, Ge and Mn, between 1200° and 1600° C.; for Co, Cr, Fe, Ni, Pd, Pt and V, between 1600° and 2000° C. and B, Mo, Nb, Ni, Ti, V, W and Zr, between 2000° and 2200° C. Chromium, nickel, platinum and/or palladium, or alloys of these, have been found particularly suitable as material for the activating layer, and especially, copper and copper alloys.

The treatment of the joint is carried out in inert or reducing atmosphere, especially in argon and/or hydrogen. It is particularly effective to operate in argon at a pressure from $10^3$ to $10^5$ Pa. The heating up time is between one and two hours under constant pressure load until the joint temperature is reached which, according to the particular activation material and the applied pressure, must be maintained for at least ten minutes after which it is followed with cooling down in a furnace.

The joint temperature is, in particular, selected to be above the melting point of the material of the thin layer and the temperature, applied pressure and handling time are determined with reference to each other and with taking account of the material of the 1 μm or less layer. The duration of the high temperature pressing effect is to be selected shorter, the higher the joining temperature lies. In an analogous way, the external pressure applied should be set the lower, the higher the joining temperature is set.

A relatively low temperature together with a relatively high pressure or a combination of high temperature, respectively small applied pressure and shortened duration of pressing seem to be favourable.

Temperatures in the region of 1500°–1800° C., especially 1550°–1750° C. are preferred and pressures from 15 to 45 MPa especially around 25 MPa, as well as pressing together for between 15 and 120 minutes, especially in the range from 30 to 60 minutes.

BRIEF DESCRIPTION OF THE DRAWINGS

The invention is further described by way of illustrative example with reference to the annexed drawings, in which.

DESCRIPTION OF THE ILLUSTRATED EMBODIMENTS

EXAMPLE 1

Figure 1:
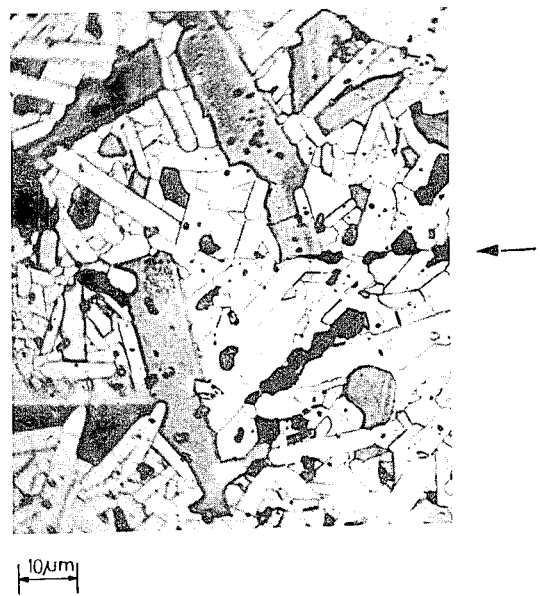
FIG. 1 shows a polished section crossing in the joint seam at a magnification of 1000.

The polished surface of a disc of pressure-less sintered silicon carbide, of a diameter of 20 mm and a thickness of 3 mm was provided with a copper layer 0.5 μm thick by sputtering. Another disc, likewise with a polished surface, was laid upon the first, with the polished surfaces in contact. They were put in a graphite matrix composed of a die and stamp. This combination was introduced under the pressure plunger of a hot press. The pressing chamber was evacuated several times and ventilated with welding argon. Finally, an argon/hydrogen pressure of 1 KPA was set and the sample was heated under applied pressure of 30 MPa at 1700° C. After 30 minutes of holding under these conditions, the heating was slowly regulated down (on the average 20° C. per minute). FIG. 1 shows the quality of the region of the joint seam after polishing and etching. Having a thickness of about 0.1 μm, this joint seam lies in the thickness range of etched grain boundaries.

EXAMPLE 2

Figure 2:
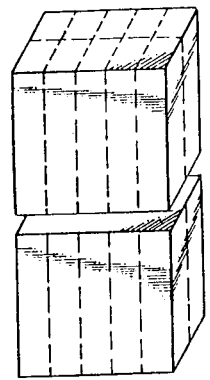
FIG. 2. is a perspective exploded view showing the subdivisions of the body joined in example 2.

A plate of pressure-less sintered silicon carbide 3 mm thick and measuring 25 by 10 mm polished on both sides and then coated on both sides with a palladium layer about 0.3 μm thick, which was applied by a roller in a manner analogous to a printing process. After vaporizing off the medium in which the palladium was dispersed, the plate was put between the polished surfaces of two SSiC blocks, each measuring 25×25×10 mm and hot pressed in a manner described in Example 1. Test bodies were then cut out of the joined sample in the form of slices of the kind illustrated in FIG. 2. After grinding and polishing, they were tested in a four-point bending test machine. The bending strength values of the individual specimens lay in the same range as the starting material (at 270±20 MPa).

EXAMPLE 3

Figure 3:
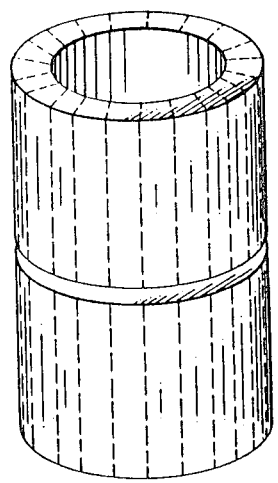
FIG. 3 is a perspective exploded view showing the geometry of the joint in Example 3.

A 3 mm piece of tube with parallel plane ends was cut from high pressure silicon carbide (H P SiC) tube having an outer diameter of 40 mm and an inner diameter of 30 mm. The end cut surfaces were both polished and both provided with a 0.2 μm thick Cr/Ni alloy layer by vapor deposition in vacuum. The resulting ring was then put between the polished base surfaces of two tubes of the same tubular material, each 28 mm long, and the three pieces were then hot pressed together in a manner analogous to that described in Example 1, in a hot press at 1800° C. under applied pressure of 50 MPa. The tube thus bonded together was then tested in a vacuum test installation for impermeability. The leakage rate was $10^{-4}$ Pals$^{-1}$. Thereafter the tube was cut transversely into segments, as shown in FIG. 3, from which right-angled bending rods were produced by grinding. After these were polished, the bending strength of the samples was measured. It was 500±30 MPa and thus lay only 4% below that of seam-free samples.

Further results are shown in the following table obtained from pressure-less sintered SiC (surface polished, lapped, and then cleaned in an ethyl acetate ultrasonic bath) with the use of thin sputtered layers of copper, copper alloys or palladium not exceeding 1 μm in thickness.

| Exp. No. | Layer Matl. | Temp. °C. | Time min. | Pressing Pressure MPa | Pressing Atmos. Pa | Bending Str. MPa |
| --- | --- | --- | --- | --- | --- | --- |
| 98 | Cu | 1550 | 60 | 15.0 | $4.0 \cdot 10^4$ | 240 ± 87 |
| 96 | Cu | 1750 | 60 | 15.0 | $4.0 \cdot 10^4$ | 200 ± 44 |
| 75 | Cu | 1750 | 60 | 24.5 | $2.7 \cdot 10^3$ | 211 ± 36 |
| 97 | Cu | 1750 | 30 | 15.0 | $4.0 \cdot 10^4$ | 233 ± 66 |
| 74 | Pd | 1750 | 60 | 24.5 | $2.7 \cdot 10^3$ | 102 ± 20 |
| 99 | Cu/Si | 1550 | 60 | 24.5 | $4.0 \cdot 10^4$ | 149 ± 19 |
| 101 | Cu/Pd | 1550 | 60 | 24.5 | $4.0 \cdot 10^4$ | 148 ± 32 |

The heating up speed was about 10° to 15° C. per minute.

As the table shows, the results obtained with copper are particularly good and clearly above the values obtainable with activating Si quantities. In particular, the bending strength at room temperature reaches up to 80% of the bending strength of the base material.

Although the activating layer is preferably of a thickness between 0.1 and 1 μm, effective bonding should be obtainable with thinner layers, so long as at least one surface is fully covered by the activating material. In principle, at least a monatonic layer fully occupying the surface should be sufficient, but as a precaution against gaps in the layer a greater thickness of the layer is helpful for example at least several atoms in thickness and preferably of at least about 10 nm thickness.

Although the invention has been described by way of illustrative examples, it will be understood that still further variations and modifications are possible within the inventive concept.

We claim:

1. Process of joining together molded silicon carbide bodies at fitting polished surfaces with an additive bond-promoting material in the joint and with pressing and heating to high temprature, said process comprising the steps of:

polishing surfaces to be joined on a plurality of silicon carbide bodies each of said bodies being made of silicon carbide sintered into a firm body, whether sintered without pressure or with hot-pressing;

applying a layer, not more than 1 $\mu$m thick and covering at least one said polished surfaces of each intended joint entirely with at least a monatomic layer composed of atoms of at least one element capable of combining chemically with at least one constituent element of silicon carbide and selected from the group consisting of Ag, Al, Au, Co, Cr, Cu Fe, Mg, Mn, Mo, Nb, Ni, Pd, Pt, Ta, Ti, V, W and Zr;

fitting together said polished surfaces of respective bodies parts, at least one of which has said applied layer, for each joint and then pressing said surfaces of each joint together, in the absence of any other binder or bond-promoting material in the joint, with a pressure in the range from 1 to 100 MPa while heating said parts at a temperature in the range from 800° to 2200° C. in a non-oxidizing atmosphere which is at a pressure in the range from $10^{-1}$ to $10^5$ Pa, whereby said bodies parts are joined and a joint seam is formed in which no metal exists as a layer extending along and between the joined surfaces that were pressed together, and cooling said joined bodies parts.

2. Process according to claim 1, wherein said non-oxidizing atmosphere is an inert atmosphere.

3. Process according to claim 1, wherein said non-oxidizing atmosphere is a reducing atmosphere.

4. Process according to claim 1, wherein said layer applied to a said polished surface has a thickness of at least 0.1 $\mu$m.

5. Process according to claim 1, wherein said at least one element applied in a layer to a said polished surface is applied by vapor deposition.

6. Process according to claim 1, wherein said at least one element applied in a layer to a said polished surface is applied to said polished surface by sputtering.

7. Process according to claim 1, wherein said at least one element applied in a layer to a said polished surface is applied by rolling on with a roller.

8. Process according to claim 1, wherein said at least one element applied in a layer to a said polished surface is selected from the group consisting of Cr, Cu, Ni, Pt and Pd.

9. Process according to claim 8, in which at least two of said elements are alloyed together in application simultaneously as a layer on said polished surface.

10. Process according to claim 1, wherein said at least one element for said layer on said polished surface is copper.

11. Process according to claim 10, wherein, in addition to copper, at least one other said element is included in said layer which is capable of forming an alloy with copper.

12. Process according to claim 1, wherein said temperature in the range from 800° to 2200° C. at which said parts are heated is sufficiently high to melt the material of said layer not more than 1 $\mu$m thick of said at least one element; said temperature being between 2000° and 2200° C. only when said layer includes in its composition at least one element of the group consisting of Mo, Nb, Ti, W and Zr; in other cases being between 1600° and 2000° C. when said layer includes in its composition at least one element of the group consisting of Co, Cr, Fe, Ni, Pd, Pt and V; between 1200° and 1600° C. when none of the foregoing elements are included in said layer and said layer contains at least one element from the group consisting of Cu, Ge and Mn, and between 800° and 1200° C. when said layer does not contain any of said elements specified in claim 1 other than Ag, Al, Au and Mg and contains at least one of them.

13. Process according to claim 12, wherein said pressure with which said surfaces of said bodies are pressed while said bodies are heated and the duration of heating are chosen to suit the magnitude of said temperature and the nature of said material of said layer.

14. Process according to claim 13, wherein said pressure of pressing said bodies together is in the range from 15 to 45 MPa, said temperature at which said parts are heated while pressed together is in the range between 1500° and 1800° C. and the duration of the application of said pressure is in the range from 15 to 120 minutes.

15. Process according to claim 14, wherein said pressure pressing said bodies together is about 25 MPa and the duration of application of said pressure is in the range from 30 to 60 minutes.

16. Process according to claim 2, wherein said inert atmosphere is an atmosphere of argon at a pressure in the range from $10^3$ to $10^5$ MPa.

17. Process of joining together molded silicon carbide bodies at fitting polished surfaces with an additive bond-promoting material in the joint and with pressing and heating to high temperature, said process comprising the steps of:

polishing surfaces to be joined on a plurality of silicon carbide bodies each of said bodies being made of silicon carbide sintered into a firm body, whether sintered without pressure or with hot-pressing;

applying a layer, not more than 1 $\mu$m thick and covering at least one said polished surfaces of each intended joint entirely with at least a monatomic layer composed of atoms of at least one element capable of combining chemically with at least one constituent element of silicon carbide and selected from the group consisting of Ag, Al, Be, Co, Cr, Cu, Fe, Mg, Mn, Pd, Pt, Ni and V;

fitting together said polished surfaces of respective bodies, at least one of which has a said applied layer, for each joint and then pressing said surfaces of each joint together, in the absence of any other binder or bond-promoting material in the joint, with a pressure in the range from 1 to 100 MPa while heating said parts at a temperature in the range from 800° to 2000° C. in a non-oxidizing atmosphere which is at a pressure in the range from $10^{-1}$ to $10^5$ Pa, whereby said bodies are joined and a joint seam is formed in which no metal exists as a layer extending along and between the joined surfaces that were pressed together, and cooling said joined bodies.

18. Process according to claim 17, wherein said layer applied to a said polished surface has a thickness of at least 0.1 μm.

19. Process according to claim 17, wherein said at least one element applied in a layer to a said polished surface is applied by vapor deposition.

20. Process according to claim 17, wherein said at least one element applied in a layer to a said polished surface is applied to said polished surface by sputtering.

21. Process according to claim 17, wherein said at least one element applied in a layer to a said polished surface is applied by rolling on with a roller.

* * * * *